United States Patent [19]

Thompson et al.

[11] Patent Number: 4,698,747

[45] Date of Patent: Oct. 6, 1987

[54] INSTRUCTION ADDRESS CALCULATION UNIT FOR A MICROPROCESSOR

[75] Inventors: Robert R. Thompson; David S. Mothersole, both of Austin, Tex.; Douglas B. MacGregor, Kyoto, Japan

[73] Assignee: Motorola, Inc., Schaumburg, Ill.

[21] Appl. No.: 750,396

[22] Filed: Jun. 28, 1985

[51] Int. Cl.⁴ ............................................. G06F 13/38
[52] U.S. Cl. .................................................... 364/200
[58] Field of Search ................................ 364/200/900

[56] References Cited

U.S. PATENT DOCUMENTS 4,342,078 7/1982 Tredennick et al. ............... 364/200

Primary Examiner—Thomas M. Heckler
Attorney, Agent, or Firm—John A. Fisher; Jeffrey Van Myers

[57] ABSTRACT

An execution unit for a microprocessor comprising a first section for performing arithmetic and logic operations on data, a second section for performing arithmetic operations on data memory addresses, and a third section for performing arithmetic operations on instruction addresses is disclosed in which data addresses and instruction addresses may be simultaneously calculated.

4 Claims, 4 Drawing Figures

INSTRUCTION ADDRESS CALCULATION UNIT FOR A MICROPROCESSOR

BACKGROUND ART

Presently known microprocessors have execution units which are used to perform arithmetic and logical operations on data and address information. Early microprocessors used a single arithmetic/logic unit to perform both types of calculations. Later generation microprocessors added one or more additional ALUs to independently perform operations on data and on memory addresses. One such MPU is the Motorola M68000 which had an execution unit partitioned such that three arithmetic operations could be performed simultaneously: data operations, memory address high (i.e., the most significant 16 bits of memory address), and memory address low. The parallelism which this allowed increased the speed of operation of the device.

In the M68000, the memory address sections of the execution unit calculated the addresses for both the data memory and the instruction memory. So while both high and low portions of an address could be simultaneously calculated, the instruction stream address and the operand (data) addresses were performed sequentially.

In the case of microprocessors intended to operate at high speeds, it is advantageous to perform as many operations as possible in parallel. This would be especially advantageous in the case in which a microprocessor has an on-chip high-speed instruction cache memory, the address for which is generated simultaneously with the operand addresses. Since an on-board cache may be accessed without reference to the MPU external bus, the operands can be accessed over the external bus while the next instruction is accessed from the cache.

BRIEF SUMMARY OF THE INVENTION

It is an object of the present invention to provide a microprocessor having the capability to independently and potentially simulataneously calculate data addresses and instruction addresses.

It is a further object of the invention to provide a microprocessor execution unit which is partitioned into data, data address and instruction address sections.

A still further object of the invention is to provide a highly parallel execution unit for a microprocessor.

These and other objects and advantages of the present invention are accomplished by providing an execution unit for a microprocessor comprising a first section for performing arithmetic and logic operations on data, a second section for performing arithmetic operations on data memory addresses, and a third section for performing arithmetic operations on instruction addresses.

DETAILED DESCRIPTION OF A PREFERRED EMBODIMENT

Figure 1:
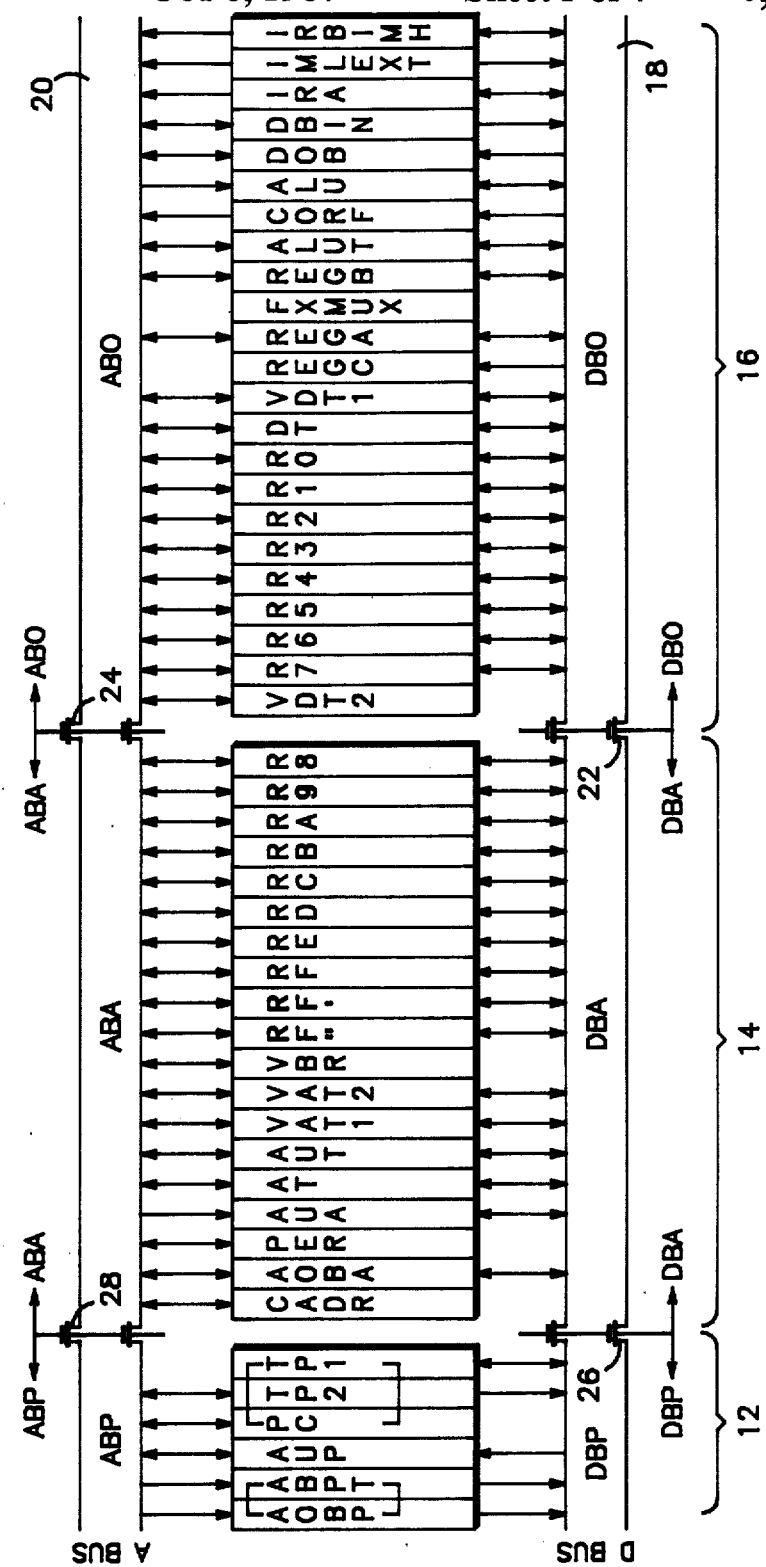
FIG. 1 is a block diagram of the execution unit of a microprocessor according to the instant invention.

FIG. 1 shows the execution unit of a microprocessor according to the invention with its associated control mechanisms. Specifically, the execution unit is shown at 10, and has a Program Counter section 12, an Address section 14 and a Data section 16. Each section is comprised of a plurality of registers and other elements, the functions of which will be discussed below. In a preferred embodiment each of the registers is 32 bits long, that is, each is capable of storing 32 bits of data.

The Program section 12, or PC section, is used to calculate instruction stream pointers, which in the preferred embodiment facilitates easier and faster access to an on-board cache memory.

The Address section 14, or A section calculates operand addresses and is used for some data manipulation.

The Data section, or D section, is the primary location for data manipulation activity.

The block diagram of FIG. 1 eliminates the control functions associated with the execution unit, which will be covered in detail below. The instruction control section is described in a co-pending patent application Ser. No. 625,066, now abandoned and assigned to the assignee of the instant invention.

FIG. 1 does show two buses, D-bus 18 and A-bus 20 which connect the elements of the three execution unit sectins and also connect the sections together through a plurality of coupling switches 22, 24, 26, 28. The buses are 32 bits wide and are differential buses with 64 lines in each.

The operation of the execution unit of the instant processor is not unlike the operation of the processor described in U.S. Pat. No. 4,342,078, Tredennick, et al, assigned to the assignee of the instant invention, in the sense that an internal clock divides the apparent machine cycle time into four time periods, T1, T2, T3, T4. Each set of T times is referred to as a "box" since the contents of one microinstruction box is executed in such a period. An example of a microinstruction box and the key for interpreting same is given in the co-pending application noted above.

Figure 2:
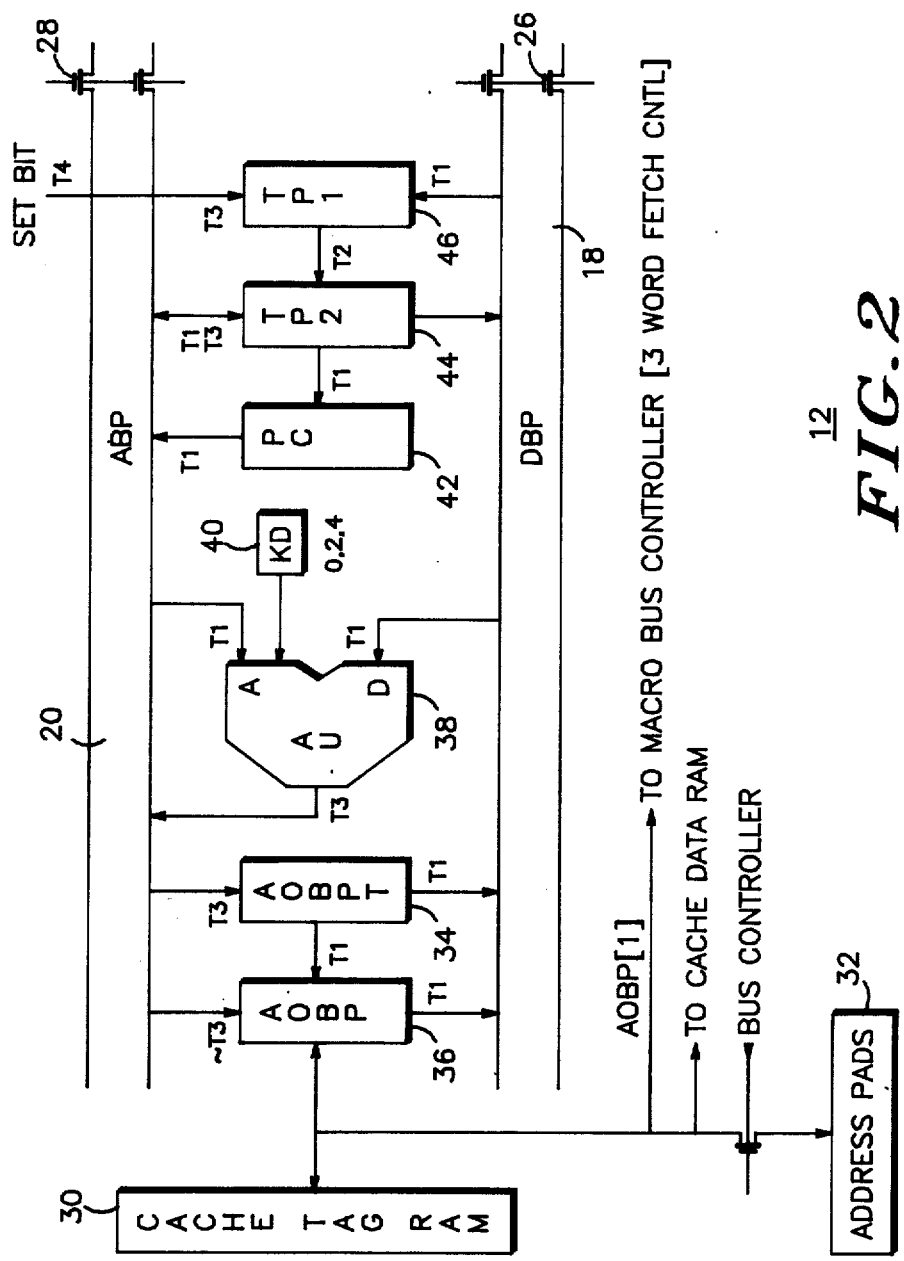
FIG. 2 is a block diagram of the Program Counter section of the execution unit of FIG. 1.

FIG. 2 is a block diagram of the PC section 12 of the microprocessor execution unit 10. The PC section of the execution unit handles all instruction stream fetches. It maintains pointers into the instruction stream as well as the program counter associated with an instruction. Instruction accesses are always read from the program space in memory and are accessed through the cache memory if the instruction is resident in the cache. The cache Tag Ram 30 provides addresses to the cache as a function of the real addresses calculated in the PC section 12 of the execution unit. The Tag Ram 30 is shown connected to external address pads 32. In the event that the required instruction is not presently located in the cache, an external memory access may be made through these address pads which are connected to leads on the microprocessor package.

The instant processor separates memory references into two classes. This creates two address spaces, each with a complete logical address range. The first class is program references, which means that the reference is to the object text of the program being executed. In particular, all instruction fetches are made from the program space.

The other class is data references. Operand reads are from the data space with the exception of immediate operands, which are embedded in the instruction stream and therefore come from program space. All operand writes are to data space.

The Address Output Buffer register AOBPT 34 is generally used to point to the next word inthe instruction stream to be fetched. It is connected betwee the A bus 20 and the D bus 18, as are most other registers. Normally an address is placed in register AOBP 36 during T3 of one box and by T1 of the following box either the access from the cache has been completed or it has been determined that a cache "miss" has occured and the address has been passed to the address pads for an external access if the pads are not currently occupied by a data address.

The AOBP register 36 is essentially a copy of AOBPT 34 and is primarily used in the case of bus conflicts. A discussion of this feature is not necessry for an understanding of the instant invention.

AU 38 is a 32 bit arithmetic unit which performs 32 bit address calculations for the PC section. The AU is capable of accepting data on a T1 clock from buses 18 and 20 and providing a result to bus 20 on T3 which can be stored in a destination register. The A input can source from the bus 20 or from a constant generator 40. The operations performed in the AU 38 are additions of A bus 20 to D bus 18. Constants available are 0, +2, and +4.

The PC register 42 functions as the program counter for instructions. It is loaded during the first T1 of an instruction and is not disturbed throughout the remainder of that instruction. PC 42 will point at the word following the first word of the instruction currently being executed. The PC is loaded from register TP2 44 over a direct path between the two registers.

Temporary Pointer register TP1 46 is used to maintain the TP2 register 44. Bit 1 of TP1 can be loaded from the bus controller (not shown), and loads TP2 over a direct path between the registers.

Temporary Pointer TP2 44 is used as a base adress for PC relative addressing. TP2 is used to point at displacements for the calculation of branch addresses as well as PC relative operand accesses. TP2 is a source to the bus 20 or 18 and is a destnation from bus 20.

Figure 3:
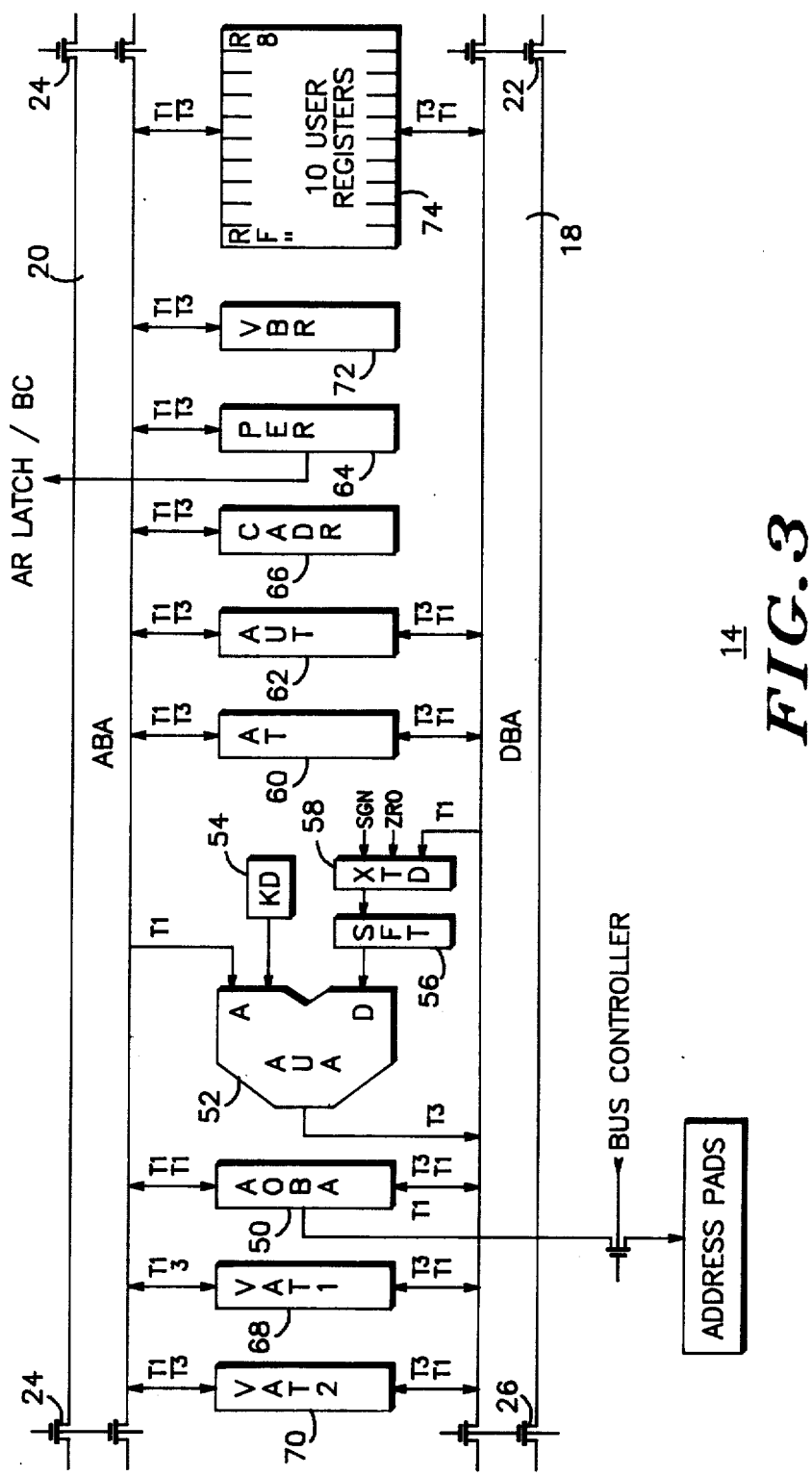
FIG. 3 is a block diagram of the Address section of the execution unit of FIG. 1.

FIG. 3 is a block diagram of the Address section of the execution unit of FIG. 1 and shows the continuation of buses 18 and 20 together with the couplers 24 and 26 which couple the Address section 14 to the PC section 12. Also shown are couplers 22 and 24 which couple the Address section 14 to the Data section 16. It should be noted that while each coupler is referenced with a single reference numeral and the drawings show only two transistors for each coupler, in practice there are 64 couplers at each location, two for each bit of the differential buses.

The Address section 14 of the execution unit 10 calculates and stores addresses associated with data accesses, and contains user as well as system address registers.

The Address Output Buffer register AOBA 50 contains the address of the operand when an access is initiated. It can also be used as a temporary storage register.

The AUA 52 is an arithmetic unit which acts as the computational unit for operand address generation. it accepts data from buses 18 and 20 during T1 and provides a result on bus 18 during T3. Inputs to the A side of AUA 52 are either constants from contstant generator 54 or data from bus 20. Input to the D side is from bus 20, but that input may be shifted left by 0,1,2, or 3 bit positions by shift circuit 56 and can be sign extended or zero extended from 8 or 16 bits to 32 bits by extender circuit 58.

The AT register 60 as an address temporary register used to store some of the intermediate address values.

AUT register 62 is an arithmetic temporary unit used to store the result of an AUA calculation.

PER latch 64 is a 32 bit register with a source and destination of bus 20 which functions as a priority encoder.

CADR 66 is a 32 bit latch which is a CPU register used for the invalidate cache entry.

VAT1 register 68 is a virtual address temporary register to store AOBA during state-saving operations.

VAT2 register 70 is another temporary virtual address register.

The VBR register 72 is a vector base register used to stor the base address of the exception vector table. This value is added to the vector offset to generate the actual vector location in the supervisor data space. VBR 72 is a source and destination to bus 20.

Register block 74 are user address registers which include general registers and stack pointers.

Descriptions of the registers in this and in the Data sections of the execution unit are not normally associated with the invention, which is the use of the PC section as an independent address generator for the instruction stream.

Figure 4:
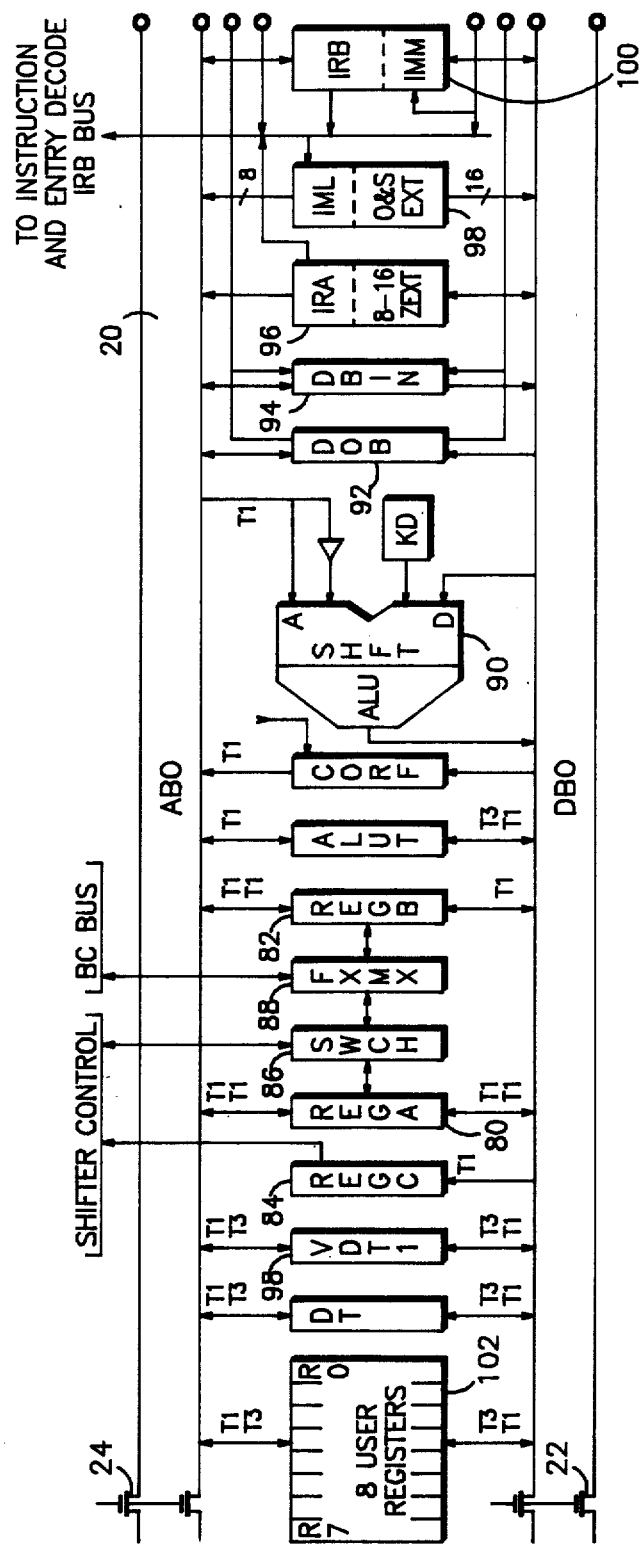
FIG. 4 is a block diagram of the Data section of the execution unit of FIG. 1.

The Data section of the execution unit is shown in FIG. 4, and contains a barrel shifter made up of registers 80, 82, and 84, a switch to connect registers 80 and 82 through the shifter 88, and the shifter itself. The Data section also comprises an ALU 90 to perform arithmetic and logical operations on data which is received from the data bus through register DBIN 94. Data is output to the data bus through register DOB 92. Registers 96, 98, and 100 are associated with the instruction pipeline which is described in detail in the co-pending U.S. Patent Applicatin noted above.

A plurality of user registers 102 are shown, but do not relate to the subject matter of the instant invention.

Thus by partitioning the execution unit of a microprocessor as described, with separate data, address, and program counter sections it is possible to increase the parallelism of the microprocessor. This is particularly significant with the instruction and data address units since, with the use of an on-board instruction cache there are separate parallel paths for the final addresses.

The PC section 12 calculates the instruction addresses regardless fo the functioning of the rest of the execution unit, since it is a self contained unit. The temporary instruction stream pointers 44 and 46 and the instruction output buffer 36 are combined with the adder 38 independently calculate the instruction stream accesses and make those accesses to the cache, through the TAG RAM 30, without interfering with other data or data addressing activities.

What is claimed is:

1. An execution unit for use in a microprocessor, comprising:
    a data section for performing arithmetic and logic operations on data,
    an address section for generating data addresses,
    a program section for generating instruction addresses,
    a data bus having a data segment selectively coupleable to the data section of the execution unit, an address segment selectively coupleable to the address section of the execution unit, and a program segment selectively coupleable to the program section of the execution unit, the data and program segments of the data bus being selectively coupleable to the address segment thereof; and an address bus having a data segment selectively coupleable to the data section of the execution unit, an address segment selectively coupleable to the address section of the execution unit, and a program segment selectively coupleable to the program section of the execution unit, the data and program segments of the address bus being selectively coupleable to the address segment thereof.

2. An execution unit as set forth in claim 1 wherein the third section includes an adder for performing arithmetic operations on the instruction addresses.

3. An execution unit as set forth in claim 2 further comprsing means for selectively providing the instruction address to a cache memory.

4. An execution unit as set forth in claim 3 further comprising means for simultaneously providing the instruction address to an external address means.

* * * * *